United States Patent

[11] 3,556,404

| | | |
|---|---|---|
| [72] | Inventor | Harold L. Walker<br>Lubbock, Tex. |
| [21] | Appl. No. | 832,061 |
| [22] | Filed | June 11, 1969 |
| [45] | Patented | Jan. 19, 1971 |
| [73] | Assignee | Prior Products, Inc.<br>Dallas, Tex.<br>a corporation of Texas |

[54] SPRINKLER BOOM RESILIENT PIVOT
6 Claims, 3 Drawing Figs.

[52] U.S. Cl. ..................................... 239/167,
239/164; 287/99
[51] Int. Cl. ...................................... B05b 1/20
[50] Field of Search ........................................ 287/14, 99;
292/209; 239/164—169

[56] References Cited
UNITED STATES PATENTS

| | | | |
|---|---|---|---|
| 2,541,417 | 2/1951 | Hartsock ...................... | 239/168 |
| 2,564,041 | 8/1951 | Vogel, Jr. ...................... | 287/99 |
| 2,910,245 | 10/1959 | Burroughs ................... | 239/167 |

*Primary Examiner*—M. Henson Wood, Jr.
*Assistant Examiner*—John J. Love
*Attorney*—Bedell and Burgess ABSTRACT: A mobile spray machine including a rectangular block pivoted to the machine on a vertical axis for pivotally supporting the spray boom and a pair of transversely extending leaf springs mounted on the machine transversely inwardly of the block so that their outer ends engage the sides of the block and bias the block and the boom mounted thereon in a direction transverse of the machine, while yielding sufficiently to permit the boom to be deflected by obstructions in its path without damage to the boom and to permit the boom to be swung to its longitudinal inoperative position for travel.

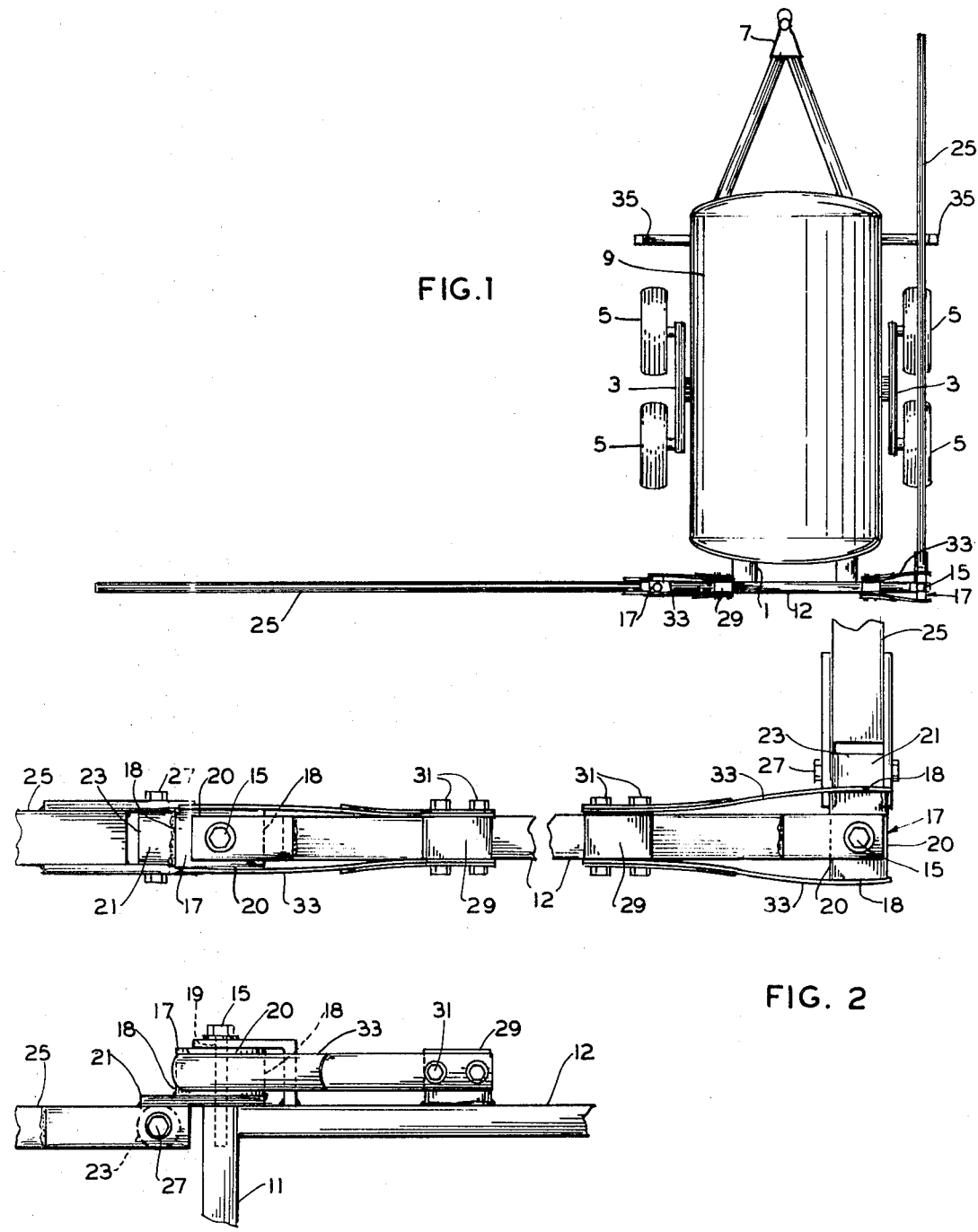

3,556,404

SPRINKLER BOOM RESILIENT PIVOT

BACKGROUND OF THE INVENTION

1. Field Of The Invention

The invention relates to mobile spray machines and consists particularly in an improved pivotal mount for the spray booms of such machines.

2. The Prior Art

Spray booms are conventionally rigidly mounted on mobile spray machines, with the result that when the machine is turned at the end of a row the boom often strikes the fence and during operation it may strike stumps, trees and the like, and is broken off, bent or otherwise damaged.

SUMMARY OF THE INVENTION

The invention solves the problem of damage to rigidly supported spray booms by providing a simple resilient vertical axis pivot mounting for the boom on the machine, which biases the boom in its transverse operational position while permitting the boom to be freely deflected about the pivot axis by obstructions such as fences, stumps, trees and the like, and also facilitating movement of the boom from transverse operating position to a nonoperating longitudinal position so as to reduce the overall width of the machine to the maximum permissible width for public roads.

BRIEF DESCRIPTION OF THE DRAWINGS

FIG. 1 is a top view of a mobile spraying machine embodying the invention.

FIG. 2 is an enlarged fragmentary top view of the spray boom pivots shown in FIG. 1, with one boom in the transverse operating position and the other in the longitudinal nonoperating travel position.

FIG. 3 is an enlarged fragmentary rear end elevation view of the spray boom pivot mount.

DESCRIPTION OF THE PREFERRED EMBODIMENT

In the drawings, the numeral 1 refers to a trailer frame mounted on a tandem axle suspension 3 having wheels 5. At its forward end, frame 1 is provided with the usual towing eye 7 for pivotal attachment to a power vehicle such as a tractor. Trailer frame 1 supports a tank 9 and, rearwardly of the tank, is provided with upright framing comprising corner posts 11 connected at their tops by transverse top beam 12.

Each corner post 11 is provided with a vertical upwardly extending pivot element, which may be a bolt 15 threadably received in the top of the post, and a rectangular block 17 having narrow ends 18, of substantially the same width as post 11 and beam 12, and sides 20 of greater length, which is centrally apertured as at 19 for pivotal mounting on element 15. A short flat bar 21 is fixed to the bottom of block 17 and its outer end is bent downwardly as at 23 to form a horizontal pivot bearing to which the bifurcated end of spray boom 25 is pivotally secured by horizontal pivot pin 27, to permit raising of the spray boom when necessary.

For resiliently maintaining the spray boom in the transverse operating position, transversely inwardly of corner posts 11, top beam 12 mounts an upstanding abutment block 29 to the opposite sides of which are secured by pairs of transversely spaced bolts 31, transversely extending leaf springs 33, the outer ends of which resiliently grip the long sides 20 of blocks 17 so as to resiliently oppose rotation of blocks 17 about pivot elements 13, and consequently maintain booms 25 in the transverse operation position while permitting their deflection by obstructions in their path.

This arrangement permits booms 25 to be rotated manually about pivot elements 13, to the longitudinal position shown on the right hand side of the drawing, in which block 17 is positioned with its narrow ends 18 in engagement with springs 33, which thus tend to maintain block 17 and the associated boom in the longitudinal or travel position. When moving the boom to travel position, it may be swung upwardly about pivot pin 27 to clear the wheels. To support the outer ends of the booms in travel position, trailer frame 1 is provided near its forward end with transversely extending brackets 35.

Operation of the machine is as follows: While moving from one job to another, both booms are in travel position with their outer ends carried by brackets 25. Upon reaching a field to be sprayed, the booms are swung outwardly to the transverse operating positions, leaf springs 33 yielding sufficiently to permit the necessary pivoting of block 17 about pivot element 13, after which they resiliently engage the long sides 20 of block 17. The engagement of springs 33 with long sides 20 of block 17 provides a substantial moment opposing pivoting of block 17 and boom 25 about pivot element 13 and the yieldability of springs 23 permits the boom and block to pivot to the rear a substantial distance upon engagement of the boom with fences, stumps, or the like, without bending or damaging the boom, while the resiliency of the springs combined with the length of pivot block sides 20 provides a sufficient moment to return the boom to its normal transverse operating position.

I claim:

1. In a mobile spraying machine, wheel supported framing, a block pivoted to said framing on a vertical axis, a spray boom supported from said block for pivoting therewith between positions transverse and longitudinal of said framing, said block having a pair of parallel flattened vertical surfaces, and a pair of leaf springs mounted on said framing on opposite sides of said block and braced toward each other in resiliently abutting engagement respectively with said vertical side surfaces of said block when said boom is in its transverse position whereby to resiliently oppose swinging movements of said boom from its transverse position.

2. In a machine according to claim 1, said flattened surfaces being substantially elongated whereby to provide an elongated moment arm to yieldingly remit swinging movements of said boom from its extended position.

3. In a machine according to claim 2, said block being of substantially rectangular shape in plan, having vertical end surfaces substantially shorter than said elongated vertical surface.

4. In a machine according to claim 3, said elongated surfaces being parallel to said boom, and said leaf springs extending transversely of the machine.

5. In a machine according to claim 4, said block being located adjacent a near corner of said framing and said boom being swingable to a forwardly extending longitudinal position, said framing being provided with a lateral bracket forward of said block for supporting said boom in its longitudinal position.

6. In a machine according to claim 4, means pivotally connecting said boom to said block on an axis transverse of said boom, whereby to permit selective upward swinging of said boom.